US011770399B2

(12) United States Patent
Charles et al.

(10) Patent No.: US 11,770,399 B2
(45) Date of Patent: Sep. 26, 2023

(54) LIGHTWEIGHT AND TRUST-AWARE ROUTING IN NOC BASED SOC ARCHITECTURES

(71) Applicant: University of Florida Research Foundation, Inc., Gainesville, FL (US)

(72) Inventors: Thelijjagoda S N Charles, Gainesville, FL (US); Prabhat Kumar Mishra, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 305 days.

(21) Appl. No.: 16/934,612

(22) Filed: Jul. 21, 2020

(65) Prior Publication Data

US 2021/0029152 A1   Jan. 28, 2021

Related U.S. Application Data

(60) Provisional application No. 62/878,147, filed on Jul. 24, 2019.

(51) Int. Cl.
*H04L 9/40* (2022.01)
*H04L 45/745* (2022.01)
(Continued)

(52) U.S. Cl.
CPC ...... *H04L 63/1433* (2013.01); *G06F 15/7825* (2013.01); *H04L 45/745* (2013.01); *H04L 49/109* (2013.01); *H04L 69/22* (2013.01)

(58) Field of Classification Search
CPC . H04L 63/1433; H04L 45/745; H04L 49/109; H04L 69/22; G06F 15/7825
See application file for complete search history.

(56) References Cited

U.S. PATENT DOCUMENTS

| 2004/0062243 | A1* | 4/2004 | Zhang | H04L 63/0236 370/392 |
| 2008/0107109 | A1* | 5/2008 | Michaud | H04L 12/12 370/390 |

(Continued)

OTHER PUBLICATIONS

Sun, Yan Lindsay, et al., "A trust evaluation framework in distributed networks: Vulnerability analysis and defense against attacks." Proceedings IEEE INFOCOM 2006. 25th IEEE International Conference on Computer Communications. IEEE, 2006, pp. 1-13, vol. 6.

(Continued)

*Primary Examiner* — William G Trost, IV
*Assistant Examiner* — Monishwar Mohan
(74) *Attorney, Agent, or Firm* — Thomas | Horstemeyer, LLP

(57) ABSTRACT

Various examples are provided related to software and hardware architectures that enable lightweight and trust-aware routing. In one example, among others, a method for trust-aware routing includes calculating trust values to represent how much a node can be trusted to route packets through its router. Each node can store the trust values of routers that are one hop and two hops away from it, which represent direct trust and delegated trust, respectively. When a router receives a packet, the router can update trust values and forward the packet to the next hop.

20 Claims, 10 Drawing Sheets

(51) Int. Cl.
*G06F 15/78* (2006.01)
*H04L 69/22* (2022.01)
*H04L 49/109* (2022.01)

(56) References Cited

U.S. PATENT DOCUMENTS

| | | | | |
|---|---|---|---|---|
| 2012/0167160 | A1* | 6/2012 | Carney | H04L 45/02 726/1 |
| 2012/0236821 | A1* | 9/2012 | Yamada | H04W 36/023 370/331 |
| 2015/0103822 | A1* | 4/2015 | Gianchandani | H04L 69/08 370/389 |
| 2015/0350038 | A1* | 12/2015 | Mohan | G06F 21/57 709/224 |
| 2017/0264533 | A1* | 9/2017 | Chopra | H04L 45/74 |
| 2020/0304477 | A1* | 9/2020 | Venkataraman | H04L 12/4633 |
| 2020/0380121 | A1* | 12/2020 | Pasricha | G06F 21/71 |

OTHER PUBLICATIONS

Yoon, Young Jin, Paolo Mantovani, and Luca P. Carloni. "System-level design of networks-on-chip for heterogeneous systems-on-chip." 2017 Eleventh IEEE/ACM International Symposium on Networks-on-Chip (NoCs). IEEE, 2017.
Murali, Srinivasan, et al. "Analysis of error recovery schemes for networks on chips." IEEE Design & Test of Computers 22.5 (2005): 434-442.
Dierks, Tim, and Eric Rescorla. "The transport layer security (TLS) protocol version 1.2." (2008): 5246. Uploaded into 2 Separate files due to size.
Boraten, Travis, Dominic DiTomaso, and Avinash Karanth Kodi. "Secure model checkers for Network-on-Chip (NoC) architectures." 2016 International Great Lakes Symposium on VLSI (GLSVLSI). IEEE, 2016.
Kapoor, Hemangee K., et al. "A security framework for noc using authenticated encryption and session keys." Circuits, Systems, and Signal Processing 32.6 (2013): 2605-2622.
Indrusiak, Leandro Soares, James Harbin, and Martha Johanna Sepulveda. "Side-channel attack resilience through route randomisation in secure real-time networks-on-chip." 2017 12th International Symposium on Reconfigurable Communication-centric Systems-on-Chip (ReCoSoC). IEEE, 2017.
JS, Rajesh, et al. "Runtime detection of a bandwidth denial attack from a rogue network-on-chip." Proceedings of the 9th International Symposium on Networks-on-Chip. 2015.
Lebiednik, Brian, et al. "Architecting a secure wireless network-on-chip." 2018 Twelfth IEEE/ACM International Symposium on Networks-on-Chip (NoCs). IEEE, 2018.
Wassel, Hassan MG, et al. "Surfnoc: A low latency and provably non-interfering approach to secure networks-on-chip." ACM SIGARCH Computer Architecture News 41.3 (2013): 583-594.
Engels, Daniel, et al. "Ultra-lightweight cryptography for low-cost RFID tags: Hummingbird algorithm and protocol." Centre for Applied Cryptographic Research (CACR) Technical Reports 29.01 (2009).
Li, Ming, Qing-An Zeng, and Wen-Ben Jone. "DyXY: a proximity congestion-aware deadlock-free dynamic routing method for network on chip." Proceedings of the 43rd annual Design Automation Conference. 2006.
Binkert, Nathan, et al. "The gem5 simulator." ACM SIGARCH computer architecture news 39.2 (2011): 1-7.
Agarwal, Niket, et al. "GARNET: A detailed on-chip network model inside a full-system simulator." 2009 IEEE international symposium on performance analysis of systems and software. IEEE, 2009.
Li, Sheng, et al. "McPAT: An integrated power, area, and timing modeling framework for multicore and manycore architectures." Proceedings of the 42nd Annual IEEE/ACM International Symposium on Microarchitecture. 2009.
Monemi, Alireza, et al. "ProNoC: A low latency network-on-chip based many-core system-on-chip prototyping platform." Microprocessors and Microsystems 54 (2017): 60-74.

* cited by examiner

Algorithm 1: Updating direct and delegated trust

```
/* This routine is called by each router every time a
   packet arrives.                                      */
/* Routine: delegateTrust                               */
/* Input: packet.                                       */
/* Current node is assumed to be α                      */
```

1  entry ← checkComTable(packet)
2  if entry ≠ NULL then
3     if entry.addr = packet.addr then
4        entry.rtxFlag ← 1
5        β ← getNextHop(packet)
6        $T_{\alpha \to \beta} \leftarrow S(x - \delta)$
7     end
8     else
9        if entry.rtxFlag ≠ 1 then
10          β ← getNextHop(packet)
11          $T_{\alpha \to \beta} \leftarrow S(x + \delta)$
12          delegateTrust()
13       end
14       updateComTable(packet)
15    end
16 end
17 else
18    updateComTable(packet)
19 end

```
/* Routine: checkComTable                               */
/* Input: packet                                        */
```

20 for entry ∈ comTable do
21    if entry.src = packet.src & entry.dest = packet.dest then
22       return entry
23    end
24 end
25 return NULL

```
/* Routine: updateComTable                              */
/* Input: packet                                        */
```

26 for entry ∈ comTable do
27    if entry.src = packet.src & entry.dest = packet.dest then
28       comTable.delete(entry)
29    end
30 end
31 newEntry.src ← packet.src, newEntry.dest ← packet.dest
32 newEntry.addr ← packet.addr, newEntry.rtxFlag ← 0
33 newEntry.timestamp ← 0
34 comTable.add(newEntry)

FIG. 5

LIGHTWEIGHT AND TRUST-AWARE ROUTING IN NOC BASED SOC ARCHITECTURES

CROSS REFERENCE TO RELATED APPLICATIONS

This application claims priority to, and the benefit of, U.S. provisional application entitled "Lightweight and Trust-Aware Routing in NoC Based SoC Architectures" having Ser. No. 62/878,147, filed Jul. 24, 2019, which is hereby incorporated by reference in its entirety.

STATEMENT REGARDING FEDERALLY SPONSORED RESEARCH OR DEVELOPMENT

This invention was made with government support under 1526687 awarded by National Science Foundation. The government has certain rights in the invention.

BACKGROUND

Increasing System-on-Chip (SoC) design complexity coupled with time-to-market constraints have motivated manufacturers to integrate several third-party Intellectual Property (IP) cores in their SoC designs. IPs acquired from potentially untrusted vendors can be a serious threat to the trusted IPs when they are connected using the same Network-on-Chip (NoC). For example, the malicious IPs can corrupt packets as well as degrade SoC performance by launching denial-of-service (DoS) attacks. While existing authentication schemes can check data integrity of packets, it can introduce unacceptable overhead on resource constrained SoCs.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 5 illustrates an example of an algorithm for updating direct and delegated trust, in accordance with various embodiments of the present disclosure.

DETAILED DESCRIPTION

Figure 1:
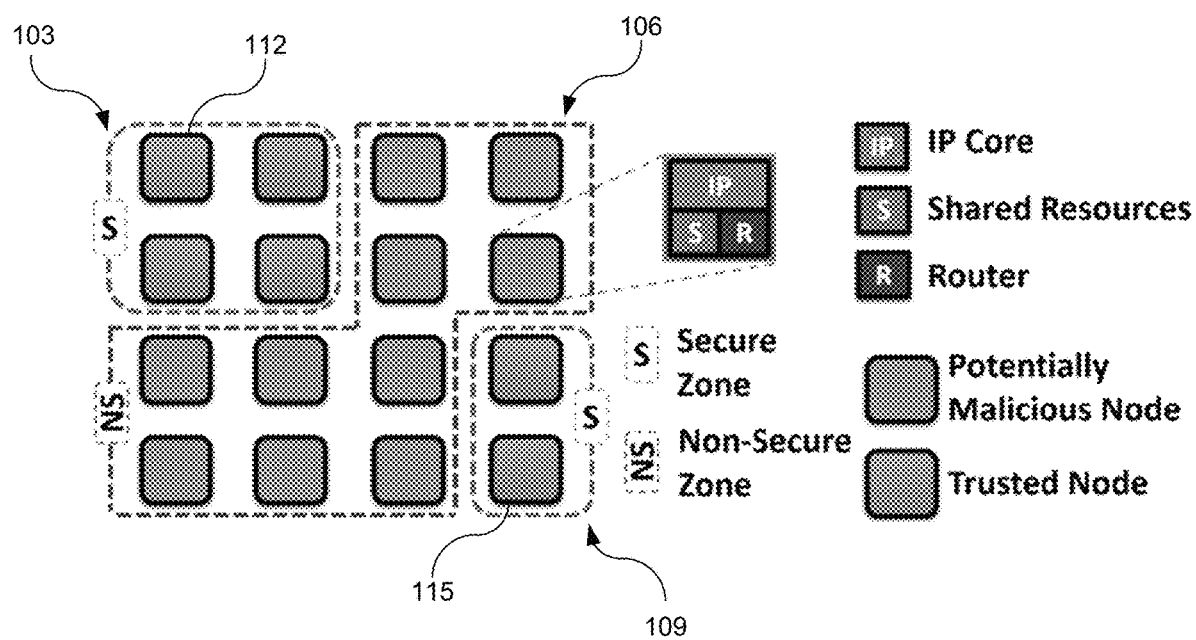
FIG. 1 illustrates an example of an SoC architecture with secure zones having trusted nodes and non-secure zones having potentially malicious nodes, in accordance with various embodiments of the present disclosure.

Disclosed herein are various examples related to software and hardware architectures that can enable lightweight and trust-aware routing to bypass malicious IPs during packet transfers with negligible hardware overhead. Trust-aware routing can reduce the number of retransmissions due to corrupted data, minimize DoS attack risk, and, as a result, improve SoC performance even in the presence of malicious IPs. Trust-aware routing can be integrated with any existing authentication scheme as well as other threat mitigation techniques, to secure an SoC while minimizing the performance and energy efficiency degradation caused by a malicious IP corrupting packets.

Reusable hardware Intellectual Property (IP) based System-on-Chip (SoC) design has emerged as a pervasive design practice in the industry to dramatically reduce design and verification cost while meeting aggressive time-to-market constraints. Growing reliance on these pre-verified hardware IPs, often gathered from untrusted third-party vendors, severely affects the security and trustworthiness of SoC computing platforms. Since malicious third-party IPs may share the same Network-on-Chip (NoC) with secure IPs, malicious IPs can adversely affect the communication between the secure IPs.

Lightweight authentication schemes implemented on NoC-based SoCs try to provide desired security while consuming minimum number of cycles. Consider a scenario in which the integrity of exchanged data is secured using a message authentication code (MAC), which is widely used in NoC-based SoCs. A source IP sends a packet together with an authentication tag, and a desetination IP recomputes the authentication tag to check data integrity. If the authentication tag does not match at the receiver's end, the packet has been corrupted during communication, and the source IP must retransmit the packet.

Retransmissions caused by corrupt packets can lead to several problems. First, retransmitting packets can cause increased latency and additional stall cycles introduced by IPs while waiting for the requested data. Second, retransmissions can increase the number of packets traversing the network and result in increased energy consumption and performance penalty. Finally, this challenge is aggravated in MAC-then-encrypt protocols because MAC can only be calculated and matched after decryption. An authentication tag is computed using plaintext and appended to the data, and the tag and plaintext are encrypted together. When a MAC is computed in this way, the destination IP has no way of knowing whether the message is authentic or corrupted until the message is decrypted. Therefore, the resources spent to decrypt a corrupted packet are wasted. Systematic exploitation of error correction protocols like these can lead to DoS attacks. For example, a malicious IP can purposefully corrupt data to cause continual retransmissions, which may lead to a DoS attack.

Previous attempts at developing security schemes for NoCs have generally tried to exploit the unique structural characteristics of the NoC and traffic transferred through the NoC. For example, the SurfNoC architecture uses the nature of NoC communication by time multiplexing the links for different domains. This allows packets of one type to traverse the network without interfering with packets from other domains, which improves performance and minimizes DoS attack risk. As another example, attempts to address challenges associated with side channel attacks on NoCs have used route randomization, data scrambling and node obfuscation. And ARM has presented the TrustZone architecture, which divides the NoC as secure and non-secure zones.

Other NoC security schemes have used the concept of "trust" between inter-connected entities to enhance the security of distributed networks such as ad-hoc networks. These security schemes use trust models to identify attacks against trust evaluation systems and build defense techniques. Concepts such as the "web-of-trust" and "pretty-good-privacy" (PGP), which are widely used in internet communication, establish a similar notion involving the authenticity of binding a public key to the owner. The OpenPGP email protocol is one such example.

Being tightly coupled together, entities on an NoC interact heavily with each other when facilitating on-chip communication. Yet the concept of trust when packets are routed through the NoC has not yet been explored. And none of the solutions discussed above can mitigate the performance and energy overhead caused by malicious IPs during an attack.

The trust-aware routing protocol disclosed herein addresses these issues by avoiding malicious IPs when routing packets between two secure nodes in an NoC-based SoC. Trust-aware routing can allow malicious IPs in a nonsecure zone to be avoided while routing through packets through trusted routers. Trust-aware routing can be implemented based on calculating trust values to represent how much a node can be trusted to route packets through its router. Each node can store the trust values of routers that are one hop and two hops away from it, which represent direct trust and delegated trust, respectively. When a router receives a packet, the router can update trust values and forward the packet to the next hop. Trust values can be dynamically updated during SoC execution since malicious IPs may shift between malicious and non-malicious behavior.

Trust-aware routing can use a trust model to quantify trust between nodes to make routing decisions. In trust-aware routing, a producer node ($\alpha$) can determine whether a consumer node ($\beta$) can be trusted to handle packets without corrupting packet data using information about the behavior of that consumer node. Using that information, the producer node can calculate a trust value that represents the trust between the producer node and the consumer node and propagate the trust value through the NoC. The trust relationship between a producer node and a consumer node can be denoted by $\alpha \rightarrow \beta$, and the corresponding trust value can be denoted by $T_{\alpha \rightarrow \beta}$.

A trust relationship between a producer node and a consumer node can be assigned a trust value between $-1$ and $1$, inclusive ($-1 \leq T_{\alpha \rightarrow \beta} \leq 1$), although any other suitable range of values may be used. For example, when a producer node is confident that a consumer node is not malicious, the trust relationship between those two nodes can be assigned a trust value of 1 ($T_{\alpha \rightarrow \beta}=1$). On the other hand, when a producer node is confident that a consumer node is malicious, the trust relationship between those two nodes can be assigned a trust value of $-1$ ($T_{\alpha \rightarrow \beta}=-1$). And when the producer node has no idea whether the consumer node is malicious or not malicious, the trust relationship between those two nodes can be assigned a trust value of 0 ($T_{\alpha \rightarrow \beta}=0$). When packet transmission begins, the trust value for each trust relationship among the nodes in an SoC can be initialized to a value of zero. Then, during packet transmission, each producer node can calculate trust values for its consumer nodes using information about the behavior of that consumer node.

Trust can be established in at least two ways: (1) direct trust, and (2) delegated trust. Direct trust can be established when a producer node calculates a trust value for a consumer node that neighbors the producer node. Delegated trust can be established when a recommender node recommends a consumer node to a producer node that is not directly connected to the consumer mode.

Trust-aware routing can function even if the IPs of all the nodes in the nonsecure zone of the NoC are malicious or if the nonsecure zone isolates the secure nodes into multiple disconnected secure zones. If all the neighbors of a node have a trust value of $-1$—meaning that all neighboring nodes have malicious IPs—a packet may still be routed through a routing path that includes those nodes because $-1$ would be the largest value. Therefore, while the packet can reach the destination node, the packet might be corrupted. But if there is a routing path from source to destination that does not contain a malicious IP, the trust-aware routing protocol can find that routing path and deliver the packets without the packets being corrupted.

In some examples, it can be assumed that a source node will only send a second request to the same destination once the first request is served. For architectures that support multiple pending requests, this scheme can easily be extended. The source node can maintain a list of pending requests and ads a header bit in the next packet to indicate that this is another request with the same source node and destination node but a different address. Then, intermediate nodes along the routing path can check this bit before removing the previous entry and trust can be increased only if this bit is not set. The rest of the methodology can remain the same.

Trust-aware routing can be easily scaled to any number of nodes and can complement existing NoC attack detection and mitigation techniques by allowing on-chip communication even in the presence of an adversary while minimizing the associated energy and performance overhead. This results in improved performance and energy efficiency. When malicious IPs corrupt packets, packets can be retransmitted and trust can be reduced. As a result, an alternative routing path is chosen. The performance improvement can depend on how quickly the algorithm chooses an alternative routing path once an attack is initiated.

The effectiveness of trust-aware routing has been evaluated using both real benchmarks and synthetic traffic patterns to demonstrate that trust-aware routing leads to significant improvement in both performance and energy efficiency. The experiments conducted using both real benchmarks and synthetic traffic patterns demonstrated significant performance and energy efficiency improvements compared to traditional XY routing in the presence of a MAC-then-encrypt security protocol. Experimental results demonstrate the effectiveness of trust-aware routing with timely attack detection and localization while incurring minor area and power overhead (less than 6% and 4%, respectively).

Reference will now be made in detail to the description of the embodiments as illustrated in the drawings, wherein like reference numbers indicate like parts throughout the several views.

FIG. 1 illustrates an example of an NoC-based SoC that includes nodes connected in a mesh topology. Each node can include an IP core that can connect to a router via a network interface. In some implementations, the network interface can accommodate an authentication scheme that implements MAC-based authentication. FIG. 1 includes a first secure zone 103, a nonsecure zone 106, and a second secure zone 109. The first secure zone 103 and the second secure zone 109 can include nodes that are considered secure because their IPs can be trusted. The nonsecure zone 106, however can include nodes that are considered nonsecure because their IPs may be malicious.

A source node 112 that can be located in the first secure zone 103 can communicate one or more packets through the nonsecure zone 106 to a destination node 115 that can be located in the second secure zone 109. If a packet traverses through a node in the nonsecure zone 106 that includes a malicious IP, the malicious IP may corrupt the packet. Then, at the destination node 115, an authentication tag computation may not match the authentication tag included with the corrupted packet. As a result, the destination node 115 can drop the packet and refrain from sending a response packet to the source node 112. Then, when the source node 112 fails to receive a response packet within a time-out period, the source node 112 can retransmit the packet.

The problem of minimizing the impact of malicious IPs is aggravated by two challenges. First, a malicious IP may not always behave maliciously. In other words, a malicious IP may only corrupt packets in sporadic intervals. Second, since the source node 112 depends on the response packet from the destination node 115 to know whether the initial packet was received or not, the malicious IP can corrupt the initial packet between the source node 112 and the destination node 115 or corrupt with the response packet between the destination node 115 and the source node 112. Both scenarios lead to the same outcome from the source node's 112 point of view. Trust-aware routing addresses both of these challenges.

Figure 2A:
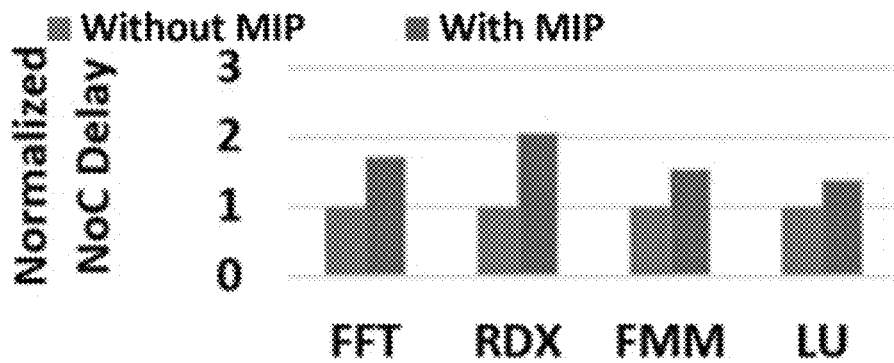
FIGS. 2A-2C illustrate examples of the delay, execution time, and number of packets injected for NoCs with and without the presence of a malicious intellectual property core, in accordance with various embodiments of the present disclosure.
Figure 2B:
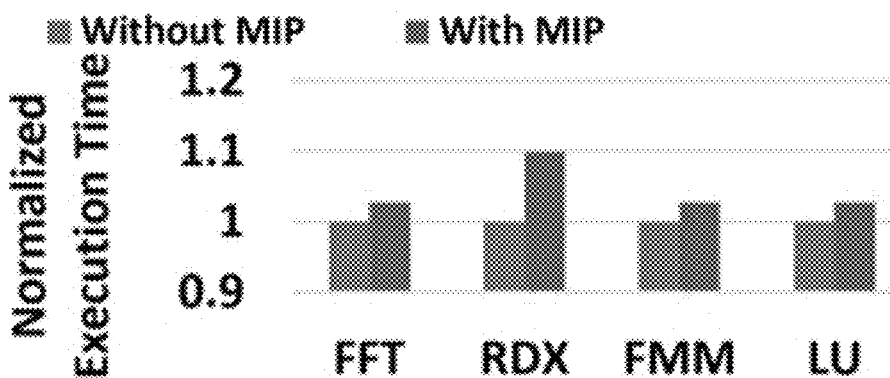
Figure 2C:
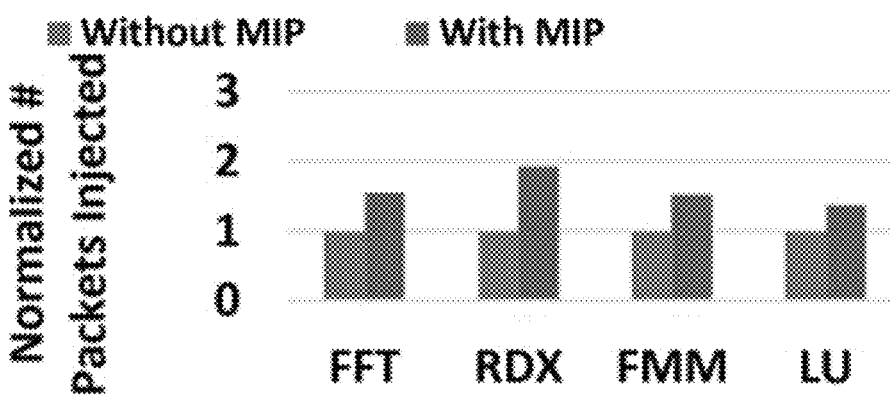

FIGS. 2A-2C illustrate examples of the results for several benchmarks run on an NoC-based SoC with and without the presence of a malicious IP. The FFT, RADIX (RDX), FMM and LU benchmarks from the SPLASH-2 benchmark suite were run on an 8×8 Mesh NoC-based SoC with 64 cores that implements a MAC-then-encrypt security protocol and an XY routing protocol. The total NoC traversal delay for all packets, execution time, and number of packets injected were recorded with and without the presence of a malicious IP. The total NoC traversal delay includes encryption/decryption and MAC calculation time. The encryption/decryption and authentication process is assumed to take 20 cycles per transmission. The behavior of a malicious IP was simulated by one of the IPs along the routing path dropping n consecutive packets after every p (period) packets, where p=20 and n=14. The combination of execution time and number of injected packets directly affect energy consumption since both time spent to execute the task and dynamic power are increased. There was a 67.2% increase in NoC delay and a 4.7% increase in execution time on average across all benchmarks. The number of packets injected increased by 60.1%. Thus, it is evident that, in addition to checking data integrity, a mechanism to avoid malicious IPs can lead to fewer retransmissions and, as a result, increased performance and energy efficiency.

FIGS. 3A-3D illustrate examples of various scenarios of trust delegation across NoC. In FIGS. 3A-3D, the values on the arrows represent trust values. For example, in FIG. 3A, T1 denotes $T_{A \to C}^{(a)}$, where the superscript (a) corresponds to FIG. 3A. In a delegated trust relationship, when B recommends C to A, $T_{A \to C}^{(a)}$ can be established if $T_{A \to C}^{(a)} \neq 0$. In other words, A may not trust a potentially malicious node to recommend another node as trustworthy. In some examples, once this condition is met, a calculation of delegated trust may adhere to one or more of the following three axioms.

AXIOM 1: In a delegated trust relationship, the trust value between a producer and a consumer may not be greater than the trust value between the producer and a recommender or the trust value between the recommender and the consumer. In the three-node setup shown in FIG. 3A, direct trust can be established between B and C and between A and B. But trust between A and C can be established via B's recommendation. Therefore, A→C is a delegated trust relationship. Thus, in FIG. 3A, the trust value between A and C does not exceed the trust value between A and B or the trust value between B and C:

$$|T_{A \to C}^{(a)}| \leq \min(T_{A \to B}^{(a)}, T_{B \to C}^{(a)}) \qquad (1)$$

AXIOM 2: A producer receiving the same recommendation about a consumer via multiple different recommenders may not reduce the trust between the producer and the consumer. In other words, the producer can either maintain the same level of certainty about the consumer or be more certain about the consumer if the producer obtains a recommendation that agrees with the producer's current opinion. In the example illustrated by FIG. 3A, A can establish trust with C via one routing path. In the example illustrated by FIG. 3B, however, trust with C can be established through two routing paths having the same trust. Formally:

$$T_{A \to C}^{(b)} \geq T_{A \to C}^{(a)} \geq 0, \text{ for } T1>0 \text{ and } T2\geq 0 \qquad (2)$$

$$T_{A \to C}^{(b)} \leq T_{A \to C}^{(a)} \leq 0, \text{ for } T1>0 \text{ and } T2<0 \qquad (3)$$

This principle may hold true if multiple routing paths give the same recommendations.

AXIOM 3: Recommendations from nodes that are independent from one another can affect delegated trust to a greater degree than recommendations from nodes that are correlated. In the example of FIG. 3C, it is possible to receive multiple recommendations from a single node (B). In FIG. 3D, however, recommendations from independent nodes like B and E are trusted more. Formally:

$$T_{A \to C}^{(d)} \geq T_{A \to C}^{(c)} \geq 0, \text{ if } T_{A \to C}^{(c)} \geq 0$$

$$T_{A \to C}^{(d)} \leq T_{A \to C}^{(c)} \leq 0, \text{ if } T_{A \to C}^{(c)} < 0 \qquad (4)$$

In some examples, a calculation of delegated trust from the point of view of any node may adhere to one or more of these axioms. For the example shown in FIG. 3A, a calculation of delegated trust may satisfy Axiom 1. To do so, trust can be calculated by concatenation as $T_{A \to C}^{(a)} = T_{A \to C}^{(a)} \cdot T_{B \to C}^{(a)}$. Thus, in general:

$$T_{\alpha \to \beta} = T_{\alpha \to \gamma} \cdot T_{\gamma \to \beta} \qquad (5)$$

where γ is the recommender. Delegated trust can be calculated if $T_{\alpha \to \gamma} > 0$. If a has no data on the trustworthiness of γ ($T_{\alpha \to \gamma}=0$), a may not trust β ($T_{\alpha \to \beta}=0$) no matter how much γ trusts β.

Figure 3A:
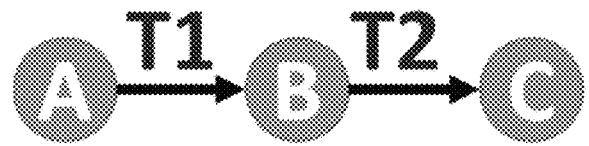
FIGS. 3A-3D illustrate examples of various scenarios of trust delegation across NoCs, in accordance with various embodiments of the present disclosure.
Figure 3B:
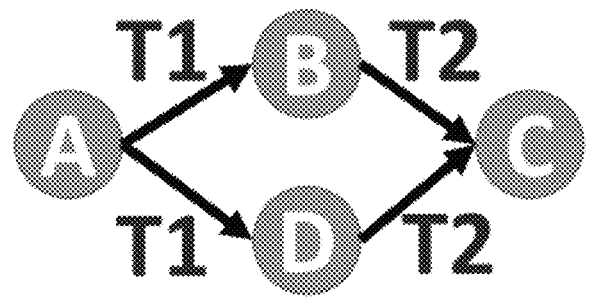
Figure 3C:
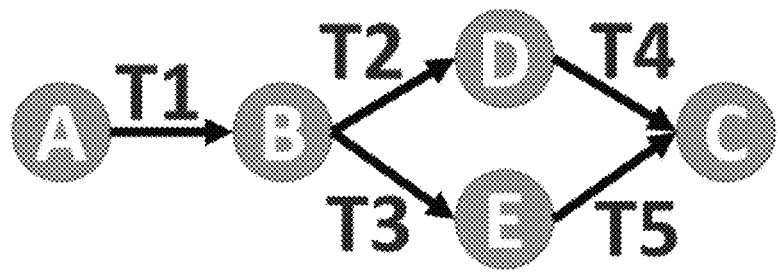
Figure 3D:
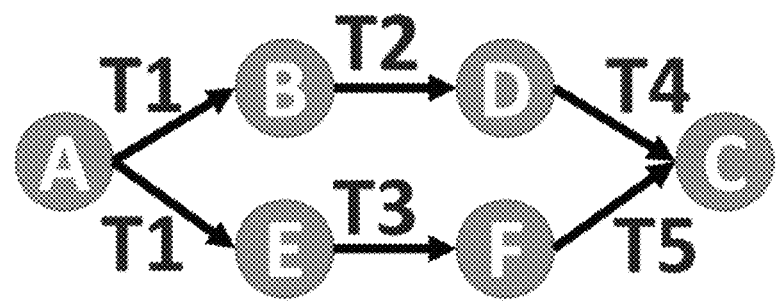

In the example in FIG. 3B and in other examples of multi-path trust delegation, a calculation of delegated trust may satisfy Axiom 1, Axiom 2, and Axiom 3. When α can establish trust with β via two paths, one via δ and another via E (α-δ-β and α-ε-β), the ratios of trust concatenation are combined:

$$T_{\alpha \to \beta} = z_1 \cdot (T_{\alpha \to \delta} \cdot T_{\delta \to \beta}) + z_2 \cdot (T_{\alpha \to \epsilon} \cdot T_{\epsilon \to \beta}) \qquad (6)$$

where $$z_1 = \frac{T_{\alpha \to \delta}}{T_{\alpha \to \delta} + T_{\alpha \to \epsilon}}, \text{ and } z_2 = \frac{T_{\alpha \to \epsilon}}{T_{\alpha \to \delta} + T_{\alpha \to \epsilon}} \qquad (7)$$

Figure 4:
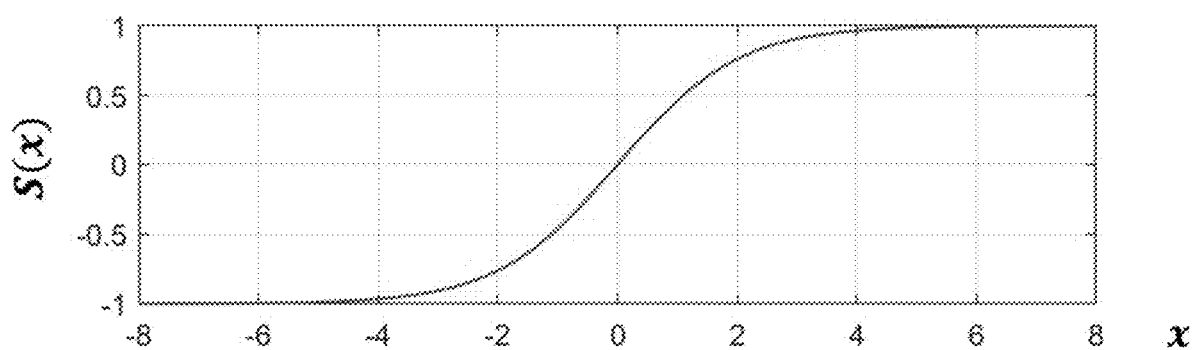
FIG. 4 illustrates an example of a variation of the Sigmoid function S(x) having input x, in accordance with various embodiments of the present disclosure.

FIG. 4 illustrates an example of a variation of a sigmoid function S(x) having input x for calculating direct trust. Direct trust can be calculated based on the sigmoid function $$\frac{1}{1+e^{-x}},$$

where x can represent the number of successful transmissions at a given node. In the example of FIG. 4, because the sigmoid function ranges between 0 and 1, the sigmoid function was scaled to a range between −1 and 1:

$$S(x) = 2 \cdot \frac{1}{1+e^{-x}} - 1 \qquad (8)$$

When packet transmission begins, if α and β are neighbors, α may initially have no trust information about β. Thus, x=0, and as a result, S(x)=0. When α receives information about β's behavior, α can change the value of x and recalculate S(x). For example, if a gets positive feedback about β's trust, direct trust can be calculated as $T_{\alpha \to \beta} = S(x+\delta)$, where δ can be a small positive number. Because S(x) is an increasing function, α's trust about β can be increased. Similarly, if α gets negative feedback about β's trust, direct trust can be calculated as $T_{\alpha \to \beta} = S(x-\delta)$ so that trust can be decreased. Therefore, direct trust can be calculated as:

$$x = x \pm \delta, \ T_{\alpha\beta} = S(x) \qquad (9)$$

FIG. 5 illustrates an example of an algorithm for updating direct trust and delegated trust. When a malicious IP is present in an NoC-based SoC, a source node may not receive a response packet after sending an initial packet to a destination node. For example, a source node might not receive a response packet because the initial packet was lost on the routing path between the source node and the destination node. If this happens, the source node can time out after a predetermined time-out period and retransmit the initial packet. Each node along the routing path that receives the retransmitted packet can determine that the packet is a retransmission and reduce the direct trust of its next-hop neighbors. Once the trust values for that routing path become lower than the trust values for other possible routing paths, future packets can take an alternate routing path to avoid malicious IPs.

As another example, the response packet may have been lost somewhere along the routing path between the source node and the destination node. In this situation, even though the destination node received the initial packet from the source node, the source node did not receive the response packet from the destination node. The source node can retransmit the initial packet, which can be received by the destination node. The destination node can determine that this is an address that was previously served and send another response packet. Each node along the routing path can determine that the packet is a retransmission and reduce direct trust with its next-hop neighbors. This process can be repeated until the response is received by source node. This can cause the routers between the source node to the destination node to reduce trust unnecessarily, leading to a "false negative." In some examples, these false negatives may not be corrected. With several ongoing communications overlapped between nodes, false negatives can regain trust over time. In other examples, false negatives can be corrected by the source node keeping track of all the paths that the re-transmitted packets took to reset trust values. Furthermore, the routers can also maintain previous trust values.

Considering these scenarios, the algorithm shown in FIG. 5 can use an event-driven approach to update trust. To begin, at line 1, when a packet arrives at a node, that node can determine whether there is already a pending communication between the source node and destination node specified by the packet. To do so, the node can check a communication table stored at the node. Each entry in the communication table can include a src field that can represent a packet's source node, a dest field that can represent a packet's destination node, and an rtx flag field that can include a retransmission flag that indicates whether a packet is a retransmission. The node can determine whether there is a pending communication between the packet's source node and destination node by matching the source node and destination node indicated by the packet header to the src fields and dest fields of the entries in the communication table.

At line 3, if there is a pending communication between the source node and destination node specified by the packet, the node can determine whether the pending communication is for the same address or for a different address. If the pending communication is for a different address, then the node can determine that the pending communication has completed successfully. If the pending communication is for the same address, then at line 4 the node can set the rtx flag field to indicate that the packet is a retransmission. Then, at line 6, the node can reduce direct trust with the next hop node.

At line 9, if the pending communication is a new communication, the node can check the rtx flag field to determine whether the pending communication has been previously identified as a retransmission. If the rtx flag field indicates that the pending communication has not been previously identified as a retransmission, then the node can increase direct trust with next hop router at line 11. At line 12, the node can delegate trust to other neighboring nodes. If the rtx flag field indicates that pending communication has previously been identified as a retransmission, the node can take no further action because direct trust with the next hop node has already been reduced in a previous iteration. In both cases, at line 14 the node can update the communication table by removing an old entry and adding a new entry.

At line 18, if the pending communication is the first communication that has passed through the node for the given source node and destination node pair, the node can create a new entry in the communication table. The communication table can also include a timestamp for each entry. The node can use the timestamp to remove old entries from the communication table after a predetermined time threshold, which can prevent excessive growth of the communication table.

Figure 6:
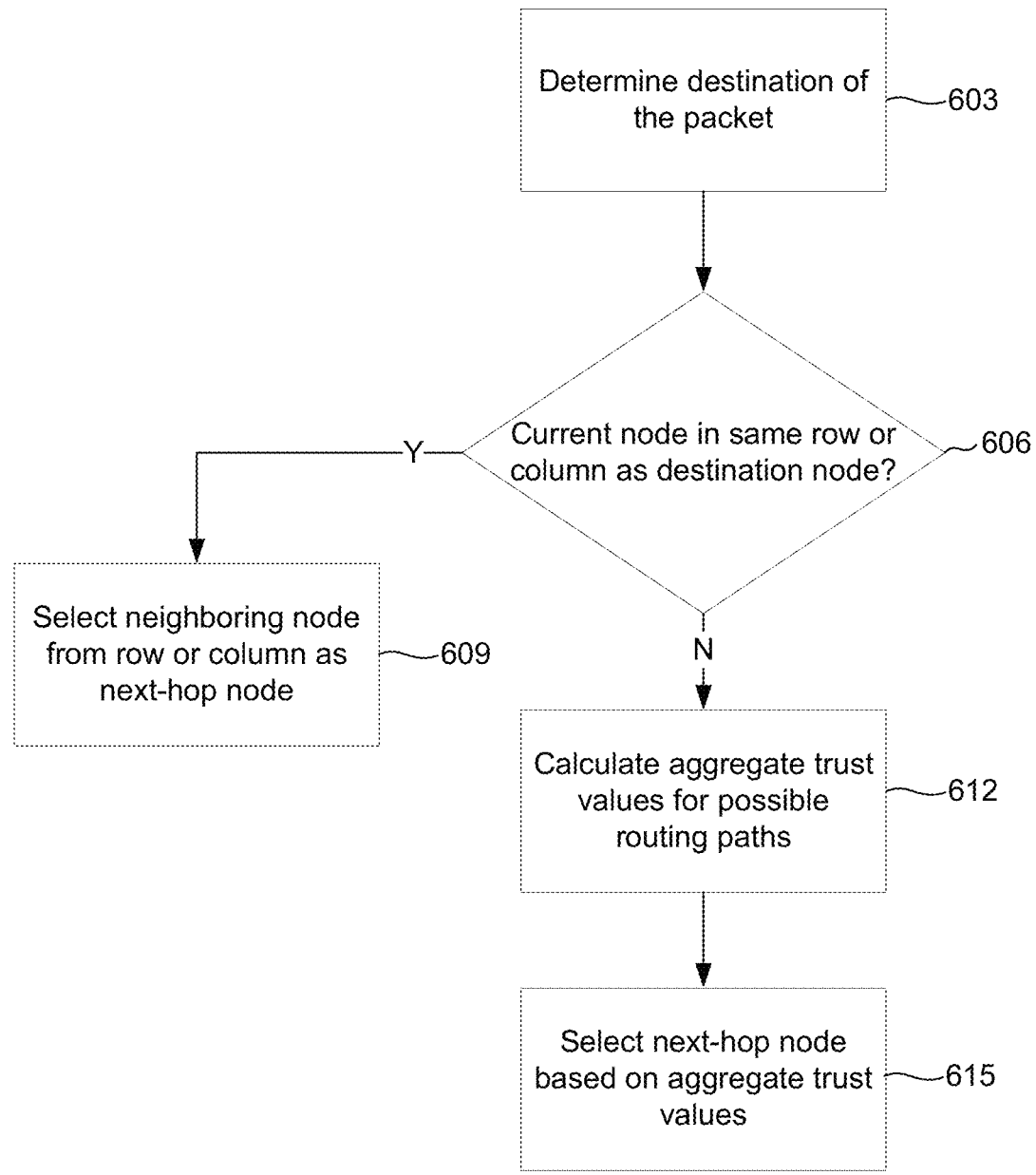
FIG. 6 illustrates an example of a flowchart showing a process for selecting a next-hop node, in accordance with various embodiments of the present disclosure.

FIG. 6 illustrates an example of a flowchart showing a process for selecting a next-hop node. This process can be used when a current node in a routing path forwards a packet or when the current node updates direct or delegated trust.

At step 603, the current node can determine the packet's destination node. For example, the current node can read an identifier from a dest field included in the packet's header. That identifier can correspond to the destination node to which the packet is being routed.

At step 606, the current node can determine whether the destination node is located in the same row of the NoC as the current node or in the same column of the NoC as the current node. For example, the current node can compare an identifier for the packet's destination node with an identifier for the current node. If the destination node is located in the same row or column as the current node, the process can proceed to step 609. If the destination node is not located in the same row or column as the current node, the process can proceed to step 612.

At step 609, the current node can select a next-hop node from the row or column of the NoC that includes the current node and the destination node. The next-hop node can be a node that neighbors the current node and that is in the direction of the destination node relative to the current node.

At step 612, the current node can calculate an aggregate trust value for every possible potential routing path that includes nodes that are one and two hops towards the destination node. An aggregate trust value for a routing path can equal to the sum of the current node's trust values for both nodes in a possible routing path. Thus, for each possible routing path, the current node can calculate the sum of the trust value for the node that is one hop away from the current node and the trust value for the node that is two hops away from the current node. Considering nodes in the direction of the destination node can ensure that a packet follows one of the shortest possible routing paths. In some examples, considering nodes in the direction of the destination node together with the use of bi-directional links allows trust-aware routing to be deadlock and livelock free.

At step 615, the current node can select a next-hop node based on the aggregate trust values for the possible routing paths. In some examples, the current node can select a neighboring node from the routing path with the greatest aggregate trust value as the next-hop node. In other examples, if two or more of the possible routing paths have aggregate trust values that are equal, the current node can choose one of these routing paths at random and select a neighboring node from the randomly chosen routing path as the next-hop node.

Figure 7:
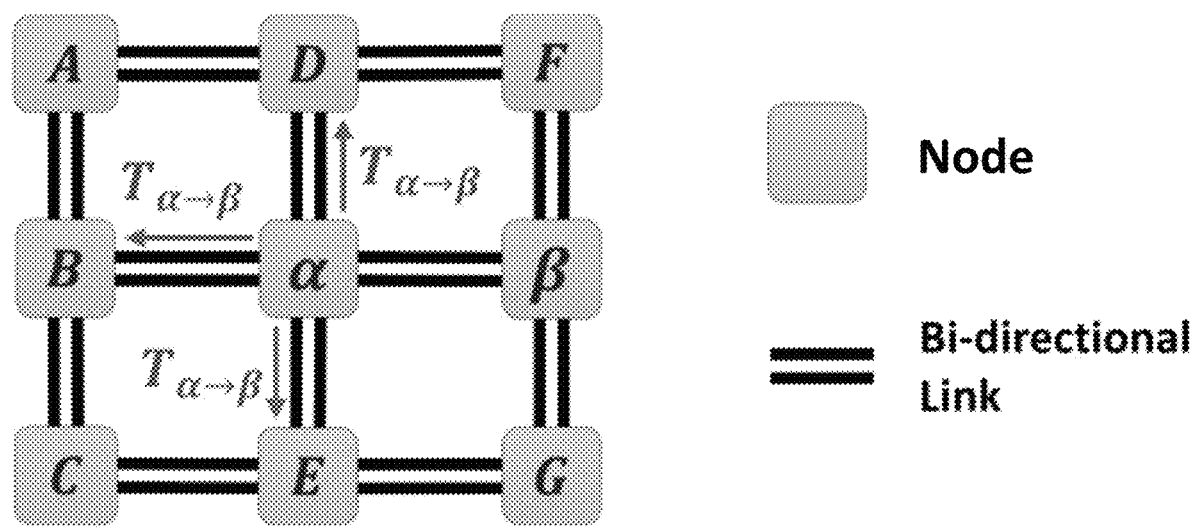
FIG. 7 illustrates an example of an NoC with routers connected in 3×3 mesh topology showing the delegation of direct trust following the completion of a communication, in accordance with various embodiments of the present disclosure.

FIG. 7 illustrates an example of an NoC with nodes connected in 3×3 mesh topology. The nodes of this NoC can be bi-directionally linked such that every node can both transmit data to and receive data from any neighboring node. The example of FIG. 7 can be used to demonstrate the delegation of direct trust following the completion of a communication and the process for selecting a next-hop node, both of which are discussed in detail above.

To illustrate trust delegation, suppose that node α completes a communication for which node β is the next-hop node. In that case, node α can delegate the direct trust value for next-hop node β ($T_{\alpha \to \beta}$) to neighboring nodes. Node α can broadcast a delegated trust packet that includes $T_{\alpha \to \beta}$ and a predetermined time-to-live value (τ) to all of α's neighboring nodes except β—in this case, nodes B, D and E. Upon receiving the delegated trust packet, nodes B, D and E can each calculate delegated trust values for node β ($T_{B \to \beta}$, $T_{D \to \beta}$, and, $T_{E \to \beta}$) using Equation (5) or any other suitable method for calculating delegated trust. As a result, B, D and E can learn about the trustworthiness of a node two hops away from them, node β. But if the delegated trust packet itself is corrupted, delegated trust may not be updated. Still, the delegated trust packet being corrupted may have no impact because a delegated trust packet being dropped means a malicious IP is on that routing path and the trust value for the corresponding will be negative. Delegated trust can be updated when it comes from a trusted source with a positive trust value according to Equation (5).

To illustrate the process for selecting the next-hop node, suppose a packet arrives at node B and that the packet has a destination of node G. Because node B is not in the same row or column as node G, the next-hop node can be selected based on the aggregate trust values for every possible routing path that includes nodes that are one hop or two hops away from node B and in the direction of node G. In this example, there are three such possible routing paths: B-α-β, B-α-E, and B-C-E. Therefore, node B can determine which of these three routing paths has the greatest aggregate trust value by, for example, calculating max($T_{B \to \alpha}+T_{B \to \beta}$, $T_{B \to \alpha}+T_{B \to E}$, $T_{B \to C}+T_{B \to E}$). Node B can then select the neighboring node from whichever routing path has the greatest aggregate trust value as the next-hope node. For example, if $T_{B \to C}+T_{B \to E}$ is the greatest aggregate trust value, then node B can select node C as the next hop node.

Figure 9A:
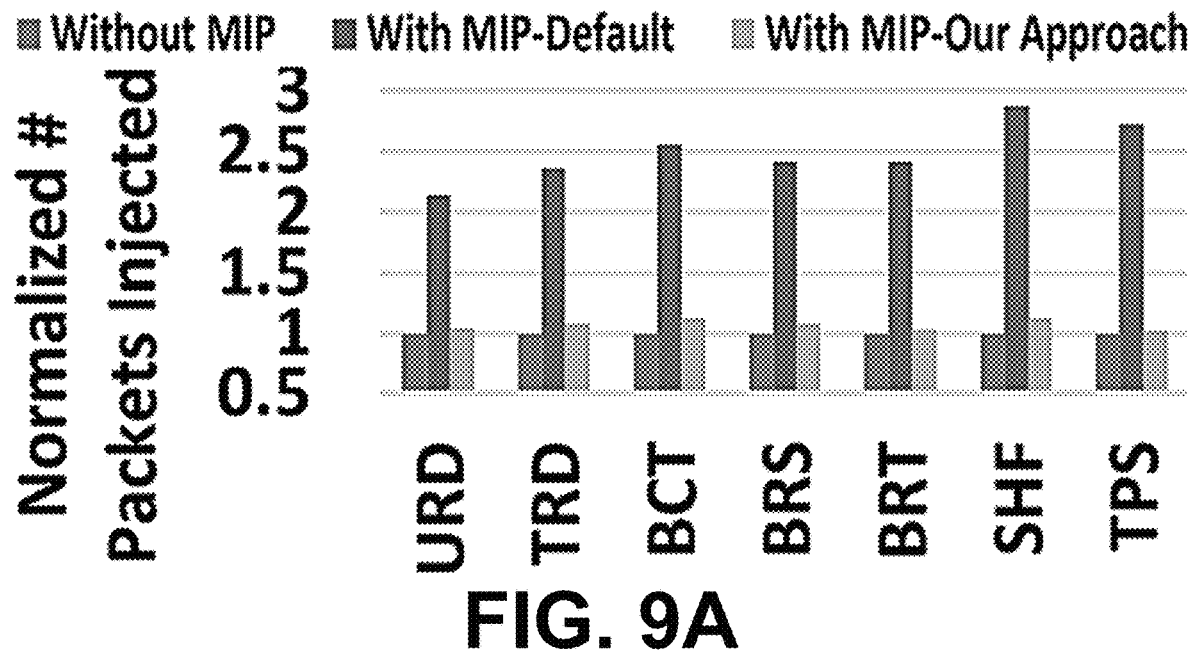
FIGS. 9A-9B illustrate examples of execution time and number of packets injected for NoCs when running synthetic traffic patterns with and without trust-aware routing, in accordance with various embodiments of the present disclosure.
Figure 9B:
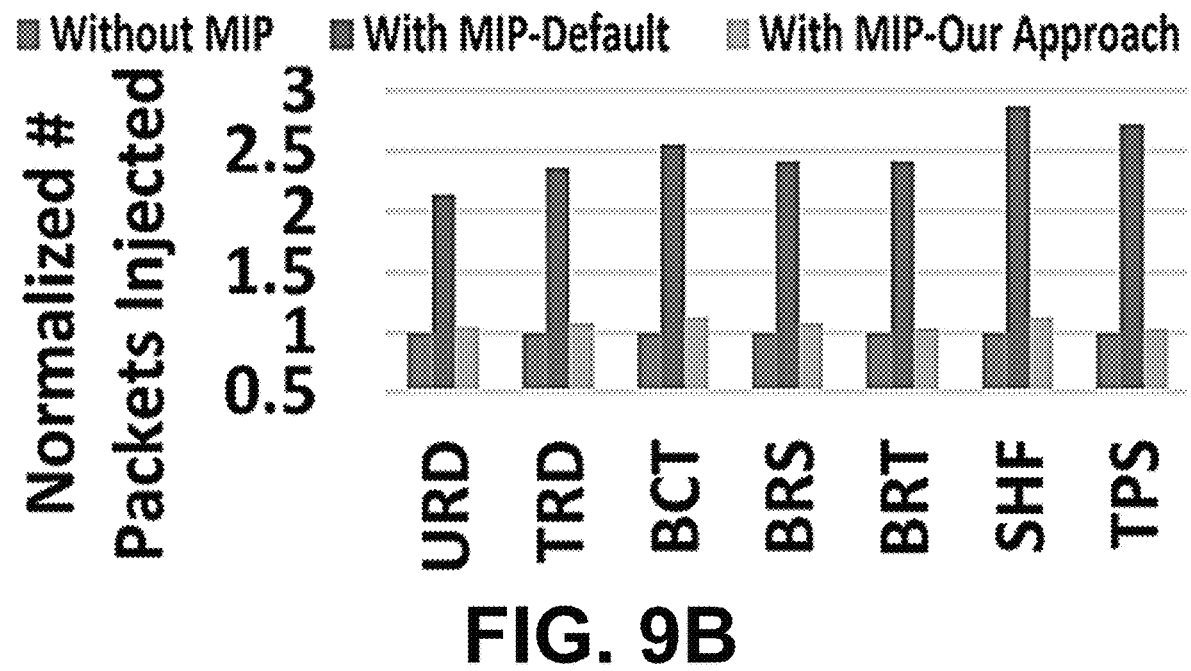
Figure 10:
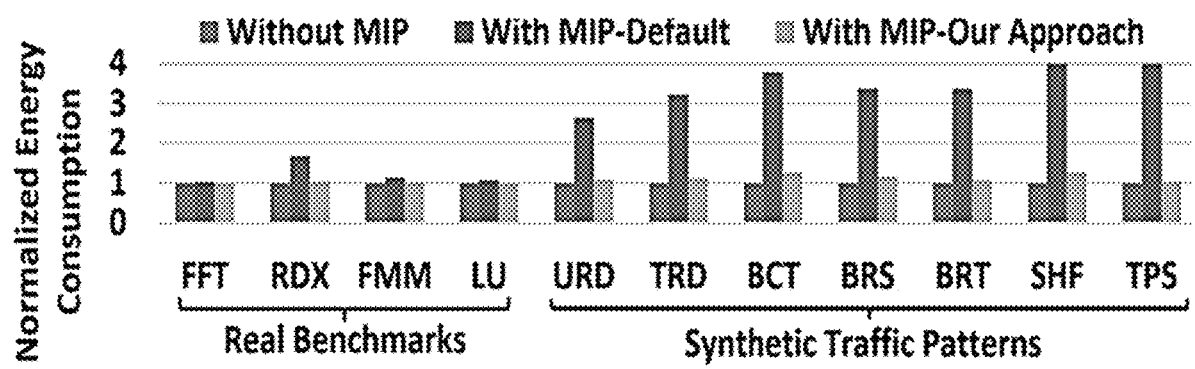
FIG. 10 illustrates an example of energy consumption for NoCs when running real benchmarks and synthetic traffic patterns with and without trust-aware routing, in accordance with various embodiments of the present disclosure.

FIGS. 8-10 illustrate examples of experimental results that demonstrate the effectiveness of trust-aware routing. For FIGS. 8-10, an 8×8 Mesh NoC-based SoC with 64 cores was modeled using the gem5 cycle-accurate full-system simulator. The interconnection network was built on top of "GARNET2.0" model that is integrated with gem5. Each router in the Mesh topology connects to four neighbors and a local IP via bidirectional links. Each IP connects to the local router through a network interface, which implements the MAC-then-encrypt protocol. The default XY routing protocol was modified to implement the trust-aware routing protocol. In these experiments, δ=0.5 (Equation 8) was used when increasing/reducing direct trust. The value 0.5 was chosen experimentally such that the algorithm chooses alternative paths as quickly as possible while minimizing the impact of false negatives.

The system was tested using 4 real benchmarks (FFT, RADIX, FMM, LU) from the SPLASH-2 benchmark suite and 7 synthetic traffic patterns (uniform random (URD), tornado (TRD), bit complement (BCT), bit reverse (BRS), bit rotation (BRT), shuffle (SHF), transpose (TPS)). When running both real benchmarks and synthetic traffic patterns, each node in the top (first) row of the Mesh NoC instantiated an instance of the task. Real benchmarks used 8 memory controllers that provide the interface to off-chip memory which were connected to the bottom eight nodes. As synthetic traffic patterns do not use memory controllers, the destination of injected packets were selected based on the traffic pattern. For example, uniform random selected the destination node from the nodes in the bottom row with equal probability. Source and destination modelling was done this way to mimic secure and non-secure zones. Four malicious IPs were modeled and assigned at random to nodes in the other six rows. To simulate sporadic behavior of the malicious IPs, each malicious IP corrupted n consecutive packets after every p (period) packets, where p=20 and n=14. According to the disclosed architecture model, the nodes in the top row (secure zone) communicate with the nodes in the bottom row (secure zone) through the other 6 rows (non-secure zone) of nodes, out of which 4 include malicious IPs. Trust-aware routing can function the same for any other secure, non-secure zone selection and malicious IP placement. The output of the gem5 simulation statistics was fed to the McPAT power modelling framework to obtain power consumption.

Figure 8A:
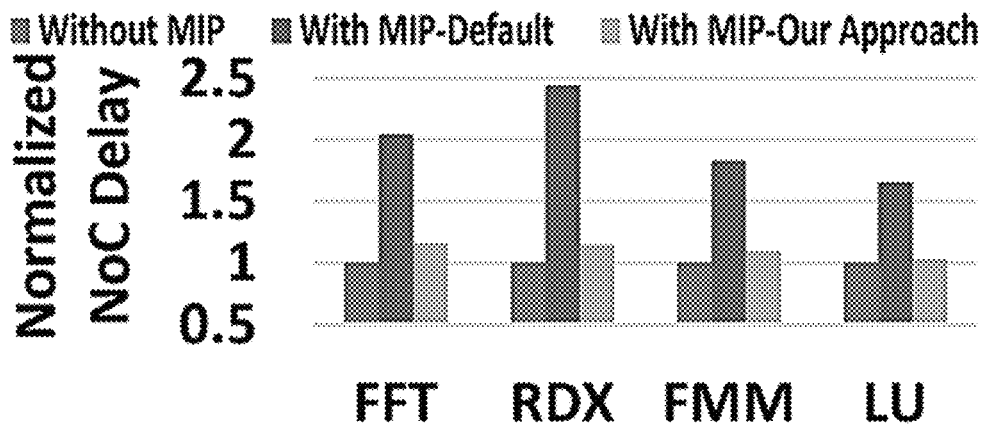
FIGS. 8A-8C illustrate examples of delay, execution time, and number of packets injected for NoCs when running real benchmarks with and without trust-aware routing, in accordance with various embodiments of the present disclosure.
Figure 8B:
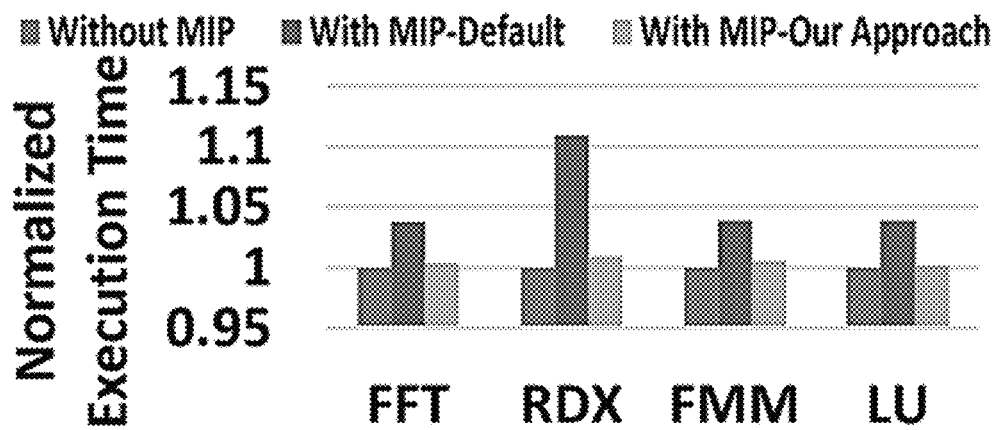
Figure 8C:
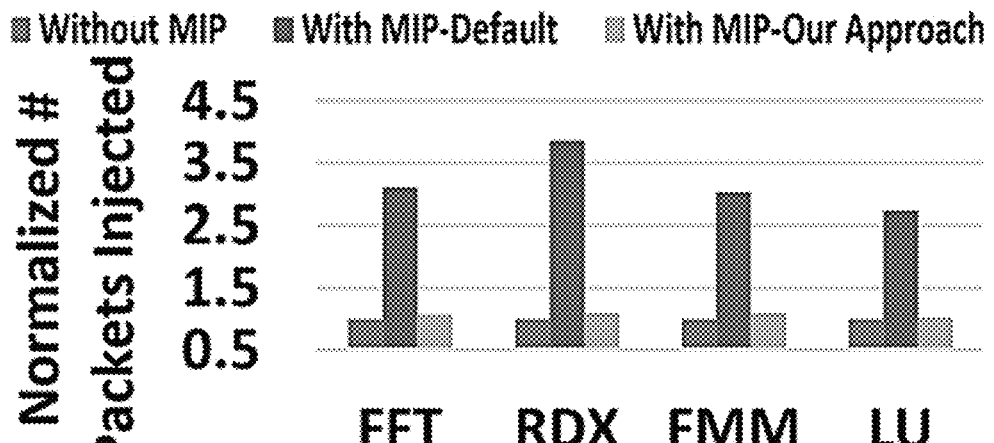

FIGS. 8A-8C illustrate examples of results for several real benchmarks run on an NoC-based SoC without the presence of a malicious IP (Without MIP), with the presence of a malicious IP when default XY routing is used (With MIP-Default), and with the presence of a malicious IP when trust-aware routing is used (With MIP-Our Approach). The total NoC traversal delay, execution time, and number of packets injected were recorded for each of these three scenarios. Trust-aware routing reduced NoC delay by 53% (43.6% on average) compared to the default XY routing protocol. Execution time and number of packets injected were reduced by 9% (4.7% on average) and 71.8% (66% on average), respectively.

FIGS. 9A-9B illustrate examples of results for several synthetic traffic patterns run on an NoC-based SoC without the presence of a malicious IP (Without MIP), with the presence of a malicious IP when default XY routing is used (With MIP-Default), and with the presence of a malicious IP when trust-aware routing is used (With MIP-Our Approach). The NoC traversal delay and the number of packets injected were recorded for each of these scenarios. The NoC delay and number of packets injected on the NoC were reduced by 57.1% (51.2% on average) and 56.7% (50.1% on average), respectively.

FIG. 10 illustrates an example of energy consumption for NoCs when running real benchmarks and synthetic traffic patterns on an NoC-based SoC without the presence of a malicious IP (Without MIP), with the presence of a malicious IP when default XY routing is used (With MIP-Default), and with the presence of a malicious IP when trust-aware routing is used (With MIP-Our Approach). As a result of reduced execution time and reduced number of retransmissions, the energy consumption of the SoC was likewise reduced. When using trust-aware routing, 47.4% (28.3% on average) less energy was consumed by real benchmarks compared to default XY routing in the presence of a malicious IP. The synthetic traffic patterns demonstrate energy savings of up to 75.6% (67.6% on average). Compared to real benchmarks, the synthetic traffic patterns show more energy reduction because synthetic traffic focuses only on network traversals. Real benchmarks, on the other hand, go through the entire processor pipeline, including instruction execution, NoC traversal, and memory operations.

In some implementations, each router can include additional hardware. This additional hardware can include extra memory to store trust values and hardware to calculate, update, and propagate trust. To accommodate a row in the communication table, 10 bytes of memory may be needed (6-bit src, 6-bit dest, 32-bit addr, 1-bit rtx flag, 32-bit timestamp). The maximum size of the communication table during the experiments was 24. This leads to 240 bytes of extra memory requirement per router.

A default 5-stage router pipeline (buffer write, virtual channel allocation, switch allocation, switch traversal and link traversal) implemented in gem5 was used. Once separate hardware is implemented, computations related to trust can be carried out in a pipelined fashion in parallel to the computations in the router pipeline. To evaluate the area overhead, the RTL design of an open source NoC router was modified and the design was synthesized with 180 nm GSCLib library from Cadence using Synopsis Design Compiler. This resulted in an area overhead of 6% compared to the default router. This shows that the trust-aware routing protocol is lightweight and can be effectively implemented at routers in an NoC-based SoC.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for trust-aware routing, comprising:
    receiving, by a node in a network-on-chip (NoC) based system-on-chip (SoC), a packet comprising a header indicating a source node and a destination node;
    checking, by the node, at least one entry in a communication table, the at least one entry comprising a source field and a destination field;
    determining, by the node, that a communication corresponding to an entry is not a retransmission;
    selecting, by the node, a next-hop node in the NoC-based SoC;
    increasing, by the node, a trust value for the next-hop node based at least in part on the communication corresponding to the entry not being a retransmission; and
    delegating, by the node, the trust value for the next-hop node to at least one neighboring node, the next-hop node not being directly connected to the at least one neighboring node within the NoC-based SoC.

2. The method of claim 1, wherein checking the at least one entry comprises comparing the source node for the packet with the source field of the at least one entry and the destination node for the packet with the destination field of the at least one entry.

3. The method of claim 1, wherein the at least one entry further comprises a retransmission flag, and determining that the communication corresponding to the entry is not a retransmission comprises checking the retransmission of the at least one entry.

4. The method of claim 1, wherein selecting the next-hop node comprises:

determining, by the node, a plurality of routing paths in a direction of the destination node;

calculating, by the node, an aggregate trust value for respective ones of the plurality of routing paths;

identifying, by the node, a routing path from the plurality of routing paths having a greatest aggregate trust value; and selecting, by the node, a neighboring node from the routing path having a greatest trust value as the next-hop node.

5. The method of claim 1, wherein delegating the trust value for the next-hop node to the at least one neighboring node comprises broadcasting a delegated trust packet comprising the trust value for the next-hop node to the at least one neighboring node, wherein the at least one neighboring node is not the next-hop node.

6. The method of claim 1, further comprising:

removing, by the node, the entry from the communication table; and creating, by the node, a new entry in the communication table corresponding to the packet.

7. A system for trust-aware routing, comprising:

a network-on-chip (NoC) based system-on-chip (SoC) comprising a plurality of nodes, a node of the plurality of nodes comprising an intellectual property core and a router; and machine-readable instructions that, when executed, cause the node to at least:

determine a plurality of paths from the node to a destination node;

receive a packet comprising a same source node and a same destination node as an entry in a communication table;

select a next-hop node in the NoC-based SoC based at least in part on an aggregate trust value corresponding to a routing path comprising the next-hop node;

calculate a trust value for the next-hop node based at least in part on whether a communication corresponding to the entry is a retransmission; and delegate the trust value for the next-hop node to at least one neighboring node, the next-hop node not being directly connected to the at least one neighboring node within the NoC-based SoC.

8. The system of claim 7, wherein the entry further comprises an address field, a timestamp, and a retransmission flag.

9. The system of claim 7, wherein the machine-readable instructions further cause the node to at least:

compare an address field corresponding to the entry with an address corresponding to the packet;

in response to determining that the address field corresponding to the entry matches the address corresponding to the packet, update a retransmission flag corresponding to the entry, the retransmission flag indicating that a communication corresponding to the entry is a retransmission; and reduce the trust value corresponding to the next-hop node.

10. The system of claim 7, wherein delegating the trust value for the next-hop node to the at least one neighboring node comprises broadcasting a delegated trust packet comprising the trust value for the next-hop node to the at least one neighboring node.

11. The system of claim 7, wherein the machine-readable instructions further cause the node to at least:

remove the entry from the communication table; and create a new entry in the communication table corresponding to the packet.

12. The system of claim 7, wherein the next-hop node is a neighboring node.

13. A method for trust-aware routing, comprising:

receiving, by a node in a network-on-chip (NoC) based system-on-chip (SoC), a packet comprising a header indicating an address;

checking, by the node, at least one entry in a communication table, the at least one entry comprising an address field;

in response to determining that the address field of the at least one entry matches the address for the packet, determining, by the node that a communication corresponding to an entry is a retransmission;

selecting, by the node, a next-hop node in the NoC-based SoC; and decreasing, by the node, a trust value for the next-hop node based at least in part on the communication corresponding to the entry being a retransmission, the next-hop node not being directly connected to the at least one neighboring node within the NoC-based SoC.

14. The method of claim 13, wherein the at least one entry further comprises a retransmission flag, and determining that the communication corresponding to the entry is a retransmission comprises checking the retransmission flag of the at least one entry.

15. The method of claim 13, wherein selecting the next-hop node comprises:

determining, by the node, a plurality of routing paths in a direction of a destination node;

calculating, by the node, an aggregate trust value for respective ones of the plurality of routing paths;

identifying, by the node, a routing path from the plurality of routing paths having a greatest aggregate trust value; and selecting, by the node, an adjacent node from the routing path having the greatest aggregate trust value as the next-hop node.

16. The method of claim 15, wherein the destination node associated with the packet is determined based at least in part on an identifier from a destination field of the packet.

17. The method of claim 15 wherein individual ones of the plurality of routing paths comprise a first node that is one hop from a current node and a second node that is two hops from the current node.

18. The method of claim 17, wherein calculating the aggregate trust value for respective ones of the plurality of routing paths further comprises calculating a sum of a first trust value for the first node and a second trust value for the second node.

19. The method of claim 18, wherein the first trust value is a direct trust value and the second trust value is a delegated trust value.

20. The method of claim 15, wherein the routing path having the greatest aggregate trust value is selected at random from a plurality of routing paths having the greatest aggregate trust value.

* * * * *